United States Patent
Trottier (10) Patent No.: US 10,260,930 B2
(45) Date of Patent: Apr. 16, 2019

(54) TESTER FOR FLUID MONITORS

(71) Applicant: Scully Signal Company, Wilmington, MA (US)

(72) Inventor: Robert Trottier, Andover, MA (US)

(73) Assignee: Scully Signal Company, Wilmington, MA (US)

( * ) Notice: Subject to any disclaimer, the term of this patent is extended or adjusted under 35 U.S.C. 154(b) by 365 days.

(21) Appl. No.: 15/171,368

(22) Filed: Jun. 2, 2016

(65) Prior Publication Data

US 2016/0356638 A1  Dec. 8, 2016

Related U.S. Application Data

(60) Provisional application No. 62/169,829, filed on Jun. 2, 2015.

(51) Int. Cl.
| | |
|---|---|
| B67D 7/08 | (2010.01) |
| B67D 7/32 | (2010.01) |
| G01F 23/24 | (2006.01) |
| G01F 25/00 | (2006.01) |
| G01F 23/292 | (2006.01) |

(52) U.S. Cl.
CPC ...... *G01F 25/0061* (2013.01); *G01F 25/0076* (2013.01); *B67D 7/085* (2013.01); *B67D 2007/329* (2013.01); *G01F 23/246* (2013.01); *G01F 23/292* (2013.01)

(58) Field of Classification Search
CPC .. G01F 25/0061; G01F 25/0076; B67D 7/085
See application file for complete search history.

(56) References Cited

U.S. PATENT DOCUMENTS

| | | |
|---|---|---|
| 5,365,420 A | 11/1994 | Cadman |
| 5,438,323 A | 8/1995 | Shea |
| 5,485,401 A | 1/1996 | Cadman |
| 5,507,326 A | 4/1996 | Cadman et al. |
| 5,771,178 A | 6/1998 | Stemporzewski, Jr. et al. |
| 5,966,311 A | 10/1999 | Stemporzewski, Jr. et al. |
| 5,986,597 A | 11/1999 | Stemporzewski, Jr. et al. |
| 7,838,859 B2 | 11/2010 | Trottier |
| 8,565,966 B2 | 10/2013 | Langlais et al. |
| 8,731,725 B2 | 5/2014 | Trottier et al. |

(Continued)

*Primary Examiner* — Paul M. West
(74) *Attorney, Agent, or Firm* — Finch & Maloney PLLC (57) ABSTRACT

A portable fluid monitoring controller tester system for fluid monitoring equipment includes a control panel, electrical interfaces, and associated circuitry for simulating the fluid overfill sensors and other features of a trailer. The tester is a self-contained device that meets or exceeds various safety standards applicable to operating in an explosive environment. The tester may be powered, at least partially, by the fluid monitoring controller to which it is connected or from another power source, such as a battery. The tester has intrinsically safe outputs, and is configured to simulate different types of sensor systems found in fuel tanker trailers, including 2-Wire Optical, 5-Wire Optical, and Thermistor sensors. The tester is further configured to simulate ground circuits and the truck identification module (T.I.M.) of the fuel tanker trailer. The tester includes an enclosure that is impact and temperature resilient, and provides protection against windblown dust, rain and splashing water.

19 Claims, 9 Drawing Sheets

(56) References Cited

U.S. PATENT DOCUMENTS

2004/0125528 A1* 7/2004 Nostrand ............ G01F 23/0084
    361/118
2011/0046820 A1* 2/2011 Lohmann ............ G01F 23/0076
    701/3

* cited by examiner

TESTER FOR FLUID MONITORS

RELATED APPLICATIONS

The present patent application claims priority under 35 U.S.C. § 119(e) to U.S. Provisional Patent Application Ser. No. 62/169,829, titled "TESTER FOR FLUID MONITORS," filed on Jun. 2, 2015, which is hereby incorporated herein by reference in its entirety.

FIELD OF THE DISCLOSURE

This disclosure relates to portable testing equipment for fluid monitoring equipment.

BACKGROUND

A fuel terminal is an industrial facility that stores oil or petrochemical products and from which these products are transported to end users or further storage facilities. A fuel terminal typically has storage tankage, either above ground or underground, and gantries that support the transfer of products from the tankage into fuel tanker trailers or other vehicles. A loading rack is a mechanism for delivering fuel from fuel terminal tankage into a fuel tanker trailer or other means of transfer outside of the fuel terminal.

Fuel tanker trailers carry fuel in multiple compartments that are generally filled from the bottom. For safety reasons, fluid overfill sensors are placed in each compartment of the trailer to detect potential fluid overfills and provide a signal indicative of an overfill fluid level in a given compartment. Additionally, the trailer is electrically grounded during the filling process to safely dissipate hazardous static electrical charges that could ignite flammable fluids and vapors. During the filling process, the signals provided by the fluid overfill sensors are monitored by a fluid monitoring controller to identify imminent fluid overfills and to prevent their occurrence by causing the loading rack to stop the filling process. The fluid monitoring controller may be an on-board controller integrated with the fuel tanker trailer or a controller integrated with the loading rack. Also, the ground signal is monitored to ensure that the trailer is properly grounded. The fluid monitoring controller should be tested periodically to verify proper operation.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Each of the following U.S. Patents is incorporated in this disclosure by reference in its entirety: U.S. Pat. Nos. 5,365,420, 5,438,323, 5,485,401, 5,507,326, 5,771,178, 5,966,311, 5,986,597, 7,838,859, 8,565,966, and 8,731,725. In addition, the standard BS EN 13922:2011, published September 2011, is hereby incorporated herein by reference in its entirety and describes the specifications for the sensors for the fluid monitoring interface to the sensors according to at least one embodiment.

Portable testing equipment for testing fluid monitoring equipment is disclosed. In some embodiments, the fluid monitoring equipment includes a fluid monitoring controller. As discussed above, a fuel terminal loading rack or fuel tanker trailer includes a fluid monitoring controller for managing the filling process of a fuel tanker trailer. Among other functions, the fluid monitoring controller monitors signals from sensors included in the compartments of the trailer and only permits the transfer of fuel to the trailer compartments when normative conditions are detected. When, for example, a fluid overfill fault or other contingent condition is detected, the fluid monitoring controller automatically stops the fuel transfer, and prevents further transfer of the fuel at least until the fluid overfill fault or other contingent condition is rectified. Testing of the fluid monitoring controller should be performed under controlled conditions to ensure that the controller is operating properly.

To this end, and in accordance with an embodiment, a portable fluid monitoring controller tester system for fluid monitoring equipment includes a control panel, electrical interfaces, and associated circuitry for simulating the fluid overfill sensors and other features of a trailer. In at least one embodiment, the tester is a self-contained device that meets or exceeds various safety standards applicable to operating in an explosive environment. The tester may be powered, at least partially, by the fluid monitoring controller to which it is connected or from another power source, such as a battery. The tester has intrinsically safe outputs, and is configured to simulate different types of sensor systems found in fuel tanker trailers, including 2-Wire Optical, 5-Wire Optical, and Thermistor sensors. The tester is further configured to simulate ground circuits and the truck identification module (T.I.M.) of the fuel tanker trailer. The tester includes an enclosure that is impact and temperature resilient, and provides protection against windblown dust, rain and splashing water. The system meets or exceeds various standards for operation in explosive environments.

The electrical interfaces include cable connectors (sockets) that allow the tester to simulate one or more different types of fuel tanker trailer interfaces that can be used in conjunction with a fluid monitoring controller. For example, the tester may include a blue 5-Wire Optical connector, a black 5-Wire Optical connector, a green 2-Wire Optical or Thermistor connector, a ground connector, or any combination of the ground and sensor connectors. The control panel includes several switches for controlling the circuitry that simulates the fluid overfill sensors and other equipment of a fuel tanker trailer. For example, the switches may be selected to simulate wet or dry conditions for each fluid overfill sensor, or to simulate the presence of a short circuit. A wet condition occurs when fluid is detected at the fluid overfill sensor. A dry condition occurs when fluid is not detected at the fluid overfill sensor. The switches may also be selected to simulate an electrical ground or ground fault signal from the fuel tanker trailer, and to simulate reading a T.I.M. serial number from the fuel tanker trailer. In some embodiments, the actions of the switches are automated and controlled via a microprocessor. The microprocessor may be configured to analyze and compare monitoring signals, timing and voltage to a standard. The microprocessor may be configured to compile the analyzed signals, timing and voltage for a certification report, and transmit the analyzed signals, timing and voltage to a distinct system via a network connection.

In some embodiments, the fluid monitoring controller tester system is designed and configured to meet or exceed one or more of the following safety approvals in at least the United States and Canada: Class I, Division 1, Group CD, T5, Type 4 or Class I, Zone 0, AEx is IIB T5, IP54 with intrinsically safe outputs to the EN 13922 connectors, with entity parameters $U_i=15V$, $I_i=260$ mA, $P_i=1.1$ W, $C_i=1.25$ μF, $L_i=0$, $U_m=15$ Vdc, and ambient temperature for all ratings $T_a \leq 0°$ C. to $+60°$ C. In some embodiments, the fluid monitoring controller tester system is designed and configured to meet or exceed one or more of the following European safety protocols: 1) Directive 99/92/EC (also known as 'ATEX 137' or the 'ATEX Workplace Directive') on minimum requirements for improving the health and safety protection of workers potentially at risk from explosive atmospheres; and 2) Directive 94/9/EC (also known as 'ATEX 95' or 'the ATEX Equipment Directive') on the approximation of the laws of Members States concerning equipment and protective systems intended for use in potentially explosive atmospheres. An ATEX-approved material, as disclosed herein, includes any material as provided by any ATEX directive that is static dissipative and not containing chrome or other metals that could spark.

Figure 1:
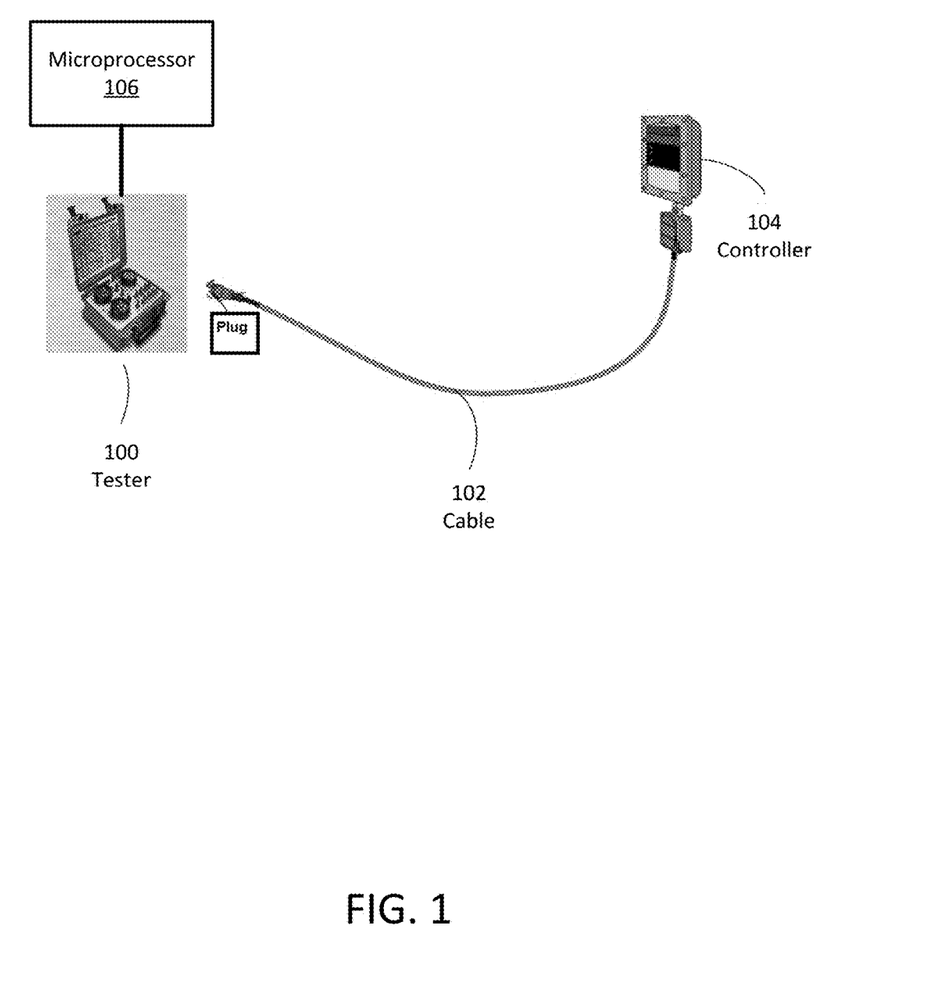
FIG. 1 shows an example fluid monitoring controller tester system, in accordance with an embodiment of the present disclosure.

FIG. 1 shows an example fluid monitoring controller tester system, in accordance with an embodiment. A portable tester 100 includes one or more electrical connectors that can be connected to a cable 102, which in turn connects the tester 100 to a fluid monitoring controller 104. In some embodiments, the tester can be connected to, or include, a microprocessor 106 to automate the tester functions. The tester 100 also includes an enclosure that, when used in conjunction with other components of the tester 100, meets or exceeds various safety ratings and standards for operation in explosive environments. The ignition level of a gas vapor is dependent upon several factors. These factors include, for example, ignition (arcing or sparking), temperature, oxygen concentration, barometric pressure and humidity. Every chemical has a different volatility, as described in NFPA 325. The gas ignition levels of most chemicals can be represented by the ignition levels of four chemical gasses including Group A (Acetylene), Group B (Hydrogen), Group C (Ethylene), and Group D (Propane). Group A is the most volatile and Group D is the least. In some embodiments, the tester 100 is designed to be used in areas that are represented by Group C, Ethylene gas. The ignition point of Ethylene, at 15 Volts DC, can be as much as 5 Amps. However, the tester 100 is designed to receive no more than 250 milliamps at 15 Volts to eliminate heat that can cause an ignition. To this end, in some embodiments, the tester includes voltage and current limiting circuitry that limits the voltage to 15 Vdc and current to 250 mA.

When the tester 100 is connected to the controller 104, the tester 100 simulates various features, functions and signals of a fuel tanker trailer, including simulating fluid overfill sensors (e.g., two-wire and five-wire configurations) and various truck (e.g., T.I.M. and ground) functions. Such functions and signals are compatible with the operation of the fluid monitoring controller 104. The tester 100 has the capability to simulate various different types of fuel tanker trailers without the need for adapters to accommodate different connectors (e.g., J1, J2 and J3 which are described further below), and allows for connection to, and diagnostic testing of, various types of fluid monitoring controllers without the need to connect the controller to an actual trailer or actual sensors. The tester 100 includes a control panel (see, e.g., FIG. 2) that is configured to enable an operator to select the simulated functions and to simulate the output signals of the fuel overfill sensors in the fuel tanker trailer. By selecting these functions and signals, the operator can verify that the fluid monitoring controller 104 is functioning correctly. For example, by simulating a fluid overfill condition in one of the trailer compartments, the operator can verify that the controller 104 generates a "NO PERMIT" condition (e.g., permission to load is denied, or fuel loading is otherwise prevented).

Figure 2:
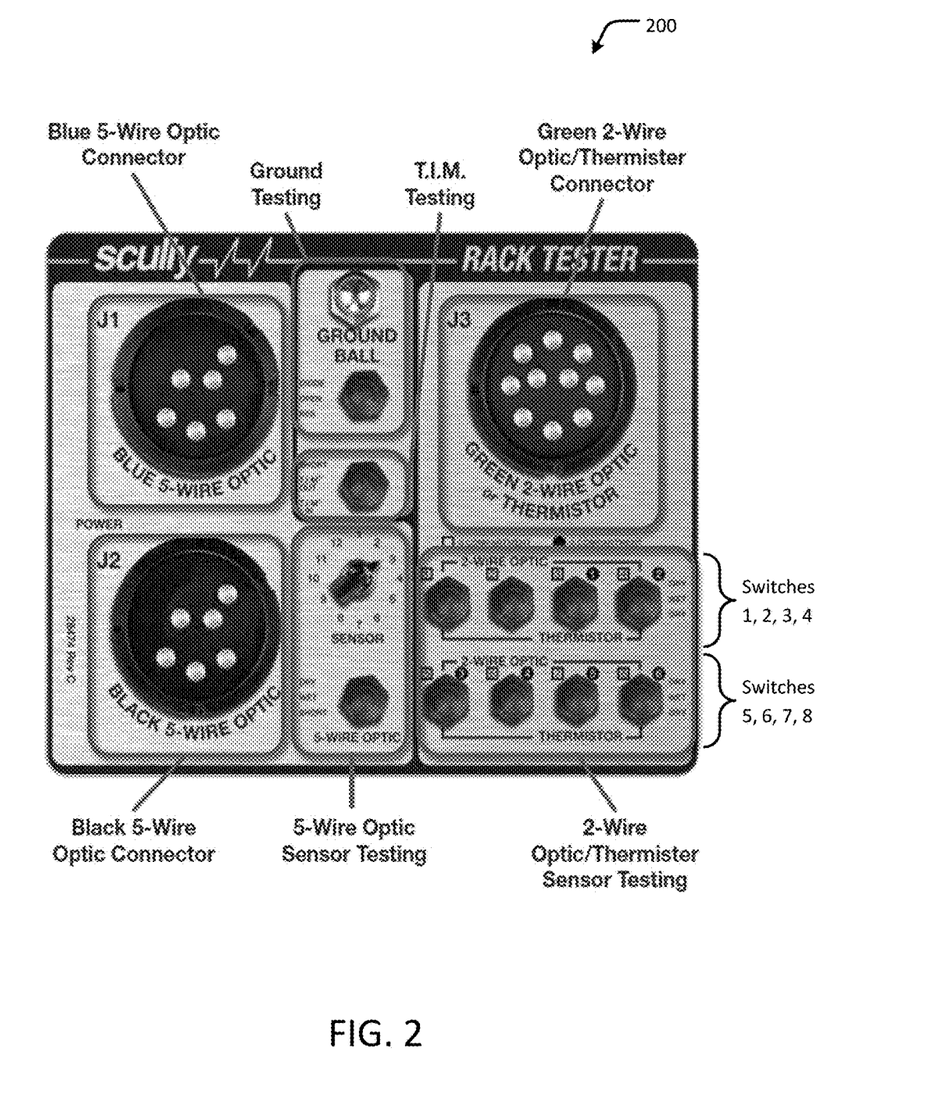
FIG. 2 shows an example control panel of a fluid monitoring controller tester system, in accordance with an embodiment of the present disclosure.

FIG. 2 shows an example control panel 200 of a fluid monitoring controller tester system, in accordance with an embodiment. The control panel 200 may, for example, be implemented in the tester 100 of FIG. 1. The control panel 200 includes a blue 5-Wire Optical connector (J1), a black 5-Wire Optical connector (J2), a green 2-Wire Optical or Thermistor connector (J3), and a ground ball socket. The control panel further includes several selector switches electrically coupled to one or more of the connectors, including a DIODE/OPEN/RES switch for ground testing; a SHORT/TIM Out/TIM In switch for simulating grounding shorts and enabling T.I.M. functions; a SENSOR switch for selecting the number of 5-Wire sensors indicated on the diagnostic line; a 5-Wire Optic switch for simulating wet, dry, or short conditions on 5-Wire sensors; switches 1, 2, 3, 4 for selecting the simulation of one of the 2-Wire optical sensors 1, 2, 3 or 4, or heated Thermistors; and switches 5, 6, 7, 8 for selecting the simulation of one of the optical sensors 5, 6, 7, or 8, or non-heated Thermistors. Any of the switches may include relays, which may be controlled by a microprocessor, or dry contacts. In some embodiments, the switches may be bypassed and their respective functions implemented by a microprocessor. Table 1 provides an additional description of the functions of each of the switches of the control panel 200.

TABLE 1

Tester Control Panel Switches

| SWITCH STATE | FUNCTION | DESCRIPTION |
| --- | --- | --- |
| DIODE<br>OPEN<br>RES | Ground testing | Up - Connects through diode<br>Mid - No/Open ground<br>Down - Resistive ground |
| SHORT<br>TIM Out<br>TIM In | Simulates power signal short & open<br>Enables T.I.M. | Up - Supply ground to signal connection<br>Mid - T.I.M. disconnected<br>Down - T.I.M. enabled |
| SENSOR | Simulates 5-Wire sensor diagnostic line including number of sensors | Sets the number of 5-Wire sensors to be indicated on the diagnostic line |
| 5-WIRE OPTIC | Simulates Wet, Dry or Short on 5-Wire sensors | Up - Simulates all Dry sensors<br>Mid - Simulates Wet sensor<br>Down - Simulates shorted sensor |
| Switches 1, 2, 3, 4 | Sensors 1, 2, 3, 4 Heated Thermistors | Up - 2-Wire Optic in<br>Mid - Open/No sensor<br>Down - Heated Thermistor in |
| Switches 5, 6, 7, 8 | Sensors 5, 6, 7, 8 Non-heated Thermistors | Up - 2-Wire Optic in<br>Mid - Open/No sensor<br>Down - Non-heated Thermistor in |

In some embodiments, the tester 100 includes one or more network connections that support wired or wireless communication with external networks (e.g., IP based networks such as LAN's and the like) using, for example, a WI-FI connection, a BLUETOOTH connection, or a ZIGBEE connection. In at least one embodiment, the tester includes hardware and software that implements a network connection over which the tester communicates with wireless sensors in the fuel tanker trailer. In another embodiment, the tester includes hardware and software that implements a network connection over which the tester communicates with a public network, such as the Internet.

An example method of using the tester 100, in accordance with an embodiment, includes the following:

1. Set state of switches of tester 100 for desired simulation conditions.
2. Connect the fluid monitoring controller 104 via cable 102 to J1, J2 or J3 of tester 100.
3. Simulate a fault by toggling the appropriate switches of tester 100.
4. Disconnect the fluid monitoring controller 104 from the tester 100.

It will be appreciated that the order of the actions recited above may be altered and some actions may be omitted without departing from the scope of the embodiments disclosed herein.

Figure 3:
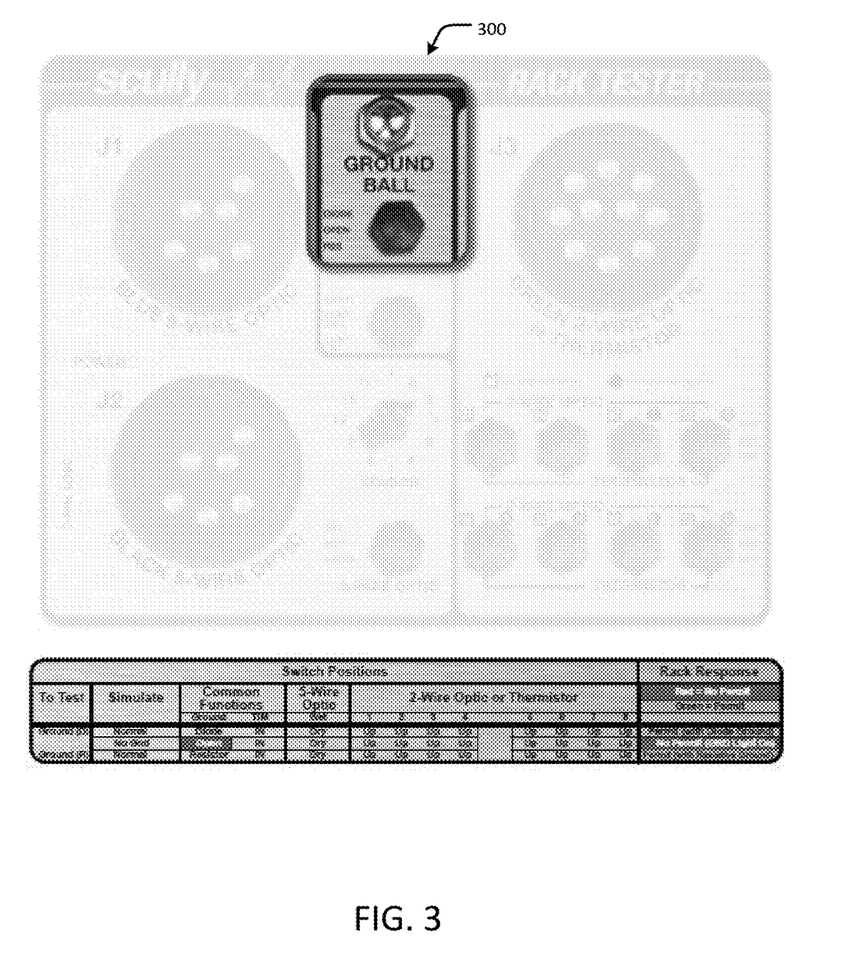
FIG. 3 shows an example methodology for ground testing of a fluid monitoring controller using a fluid monitoring controller tester system, in accordance with an embodiment.

FIG. 3 shows an example methodology for ground testing of a fluid monitoring controller using a fluid monitoring controller tester system, in accordance with an embodiment. The ground testing switch 300 of the control panel 200 has three positions or states. The upper position connects the Ground Ball to Ground through a Diode (also referred to as a diode ground), which should illuminate a Permit indicator on the controller 104, with a Diode Ground. The center position disconnects the Ground Ball entirely, which should illuminate a NO-PERMIT GND indicator on the controller 104. The Bottom position connects the Ground Ball to ground through a resistor (e.g., 1000 Ohm) (also referred to as a resistive ground), which should illuminate a PERMIT with a resistive ground indicator. FIG. 3 shows the expected Rack Response to each of the various possible switch settings on the tester, in accordance with an embodiment.

Figure 4:
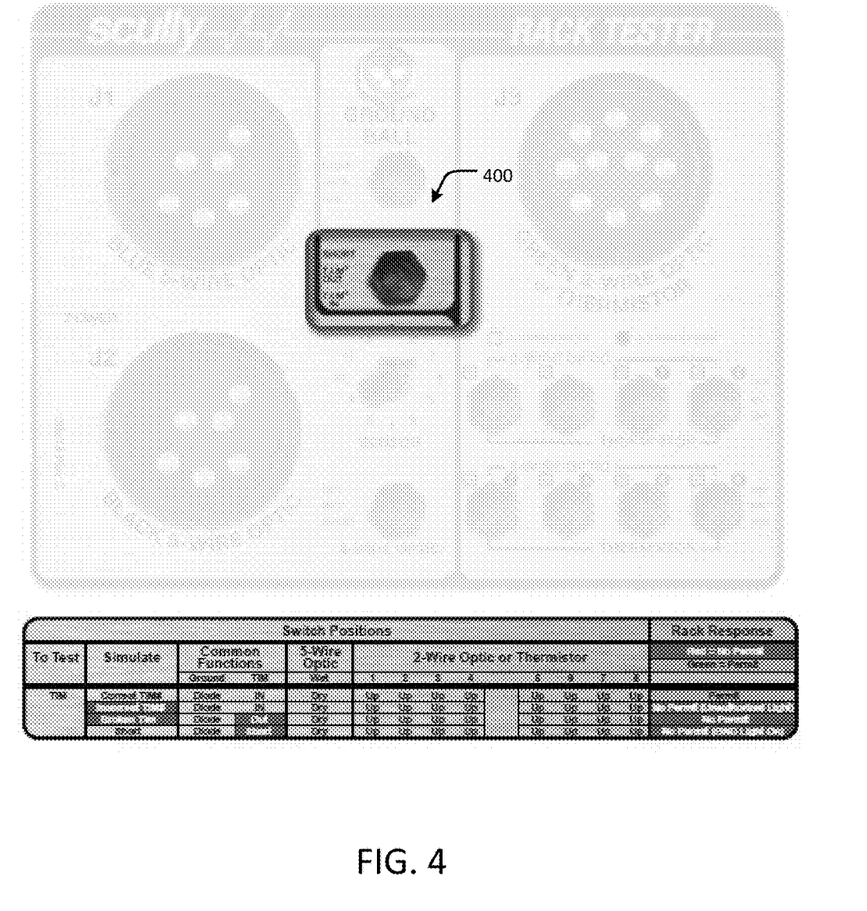
FIG. 4 shows an example methodology for T.I.M. (Truck Identification Module) testing of a fluid monitoring controller using a fluid monitoring controller tester system, in accordance with an embodiment.

FIG. 4 shows an example methodology for T.I.M. testing of a fluid monitoring controller using a fluid monitoring controller tester system, in accordance with an embodiment. The T.I.M. switch 400 of the control panel 200 has three positions or states. The upper position (spring returned, momentary connection) disconnects the T.I.M. module and provides a shorted path from a signal connector (e.g., Pin 9) to Ground. In the momentary upper SHORT position, the NO-PERMIT GND indicator on the controller 104 should be illuminated. In the center position, the T.I.M. is disconnected, and the NO-PERMIT Idle indicator on the controller 104 should be illuminated. In the bottom position, the T.I.M. is connected and the PERMIT indicator will illuminate on the controller 104. FIG. 4 shows the expected Rack Response to each of the various possible switch settings on the tester, in accordance with an embodiment.

Figure 5:
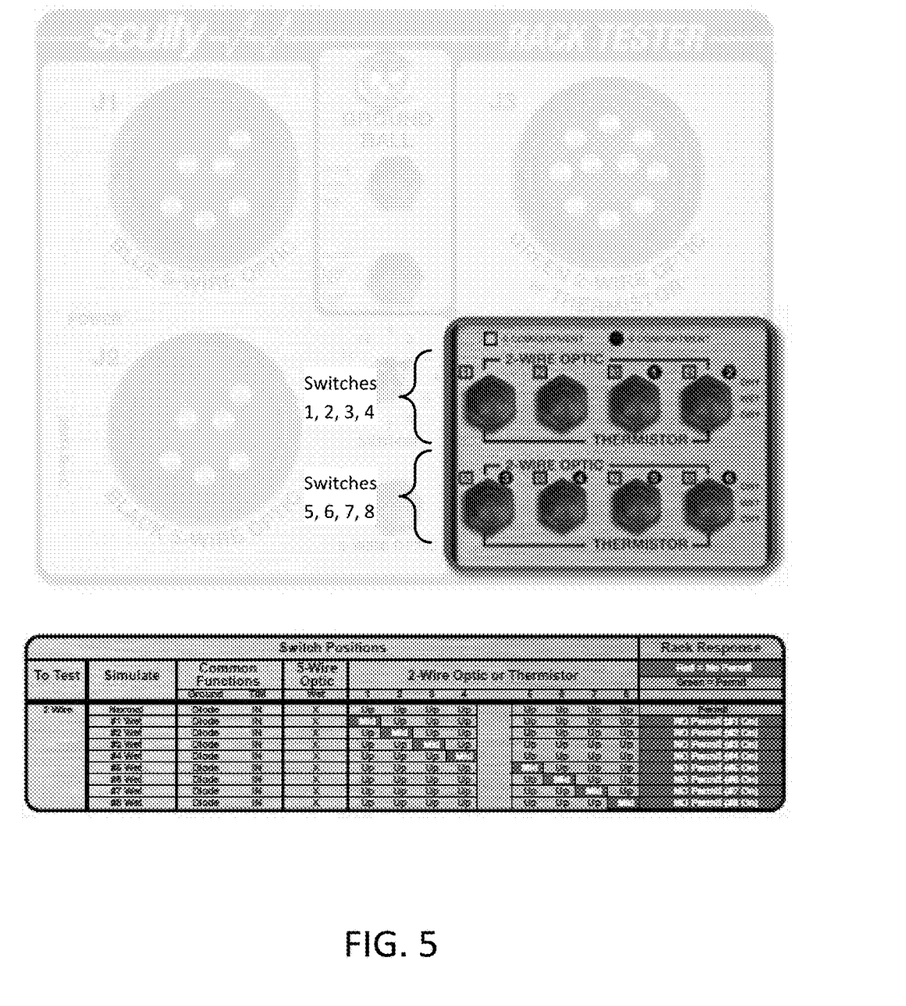
FIG. 5 shows an example methodology for 2-Wire Optical sensor testing of a fluid monitoring controller using a fluid monitoring controller tester system, in accordance with an embodiment.

FIG. 5 shows an example methodology for 2-Wire Optical sensor testing of a fluid monitoring controller using a fluid monitoring controller tester system, in accordance with an embodiment. For 2-Wire Optical sensor testing, the states of switches 1 through 8 replicate the functions of eight 2-Wire Optical sensors in the fuel tanker trailer. When all eight switches are UP, all sensors are simulated as reporting DRY, and therefore the PERMIT indicator should illuminate on the controller 104. When any of the eight switches are moved to the CENTER position, simulating a WET condition, the NO-PERMIT indicator for the corresponding sensor should illuminate on the controller 104. FIG. 5 shows the expected Rack Response to each of the various possible switch settings on the tester, in accordance with an embodiment.

Figure 6:
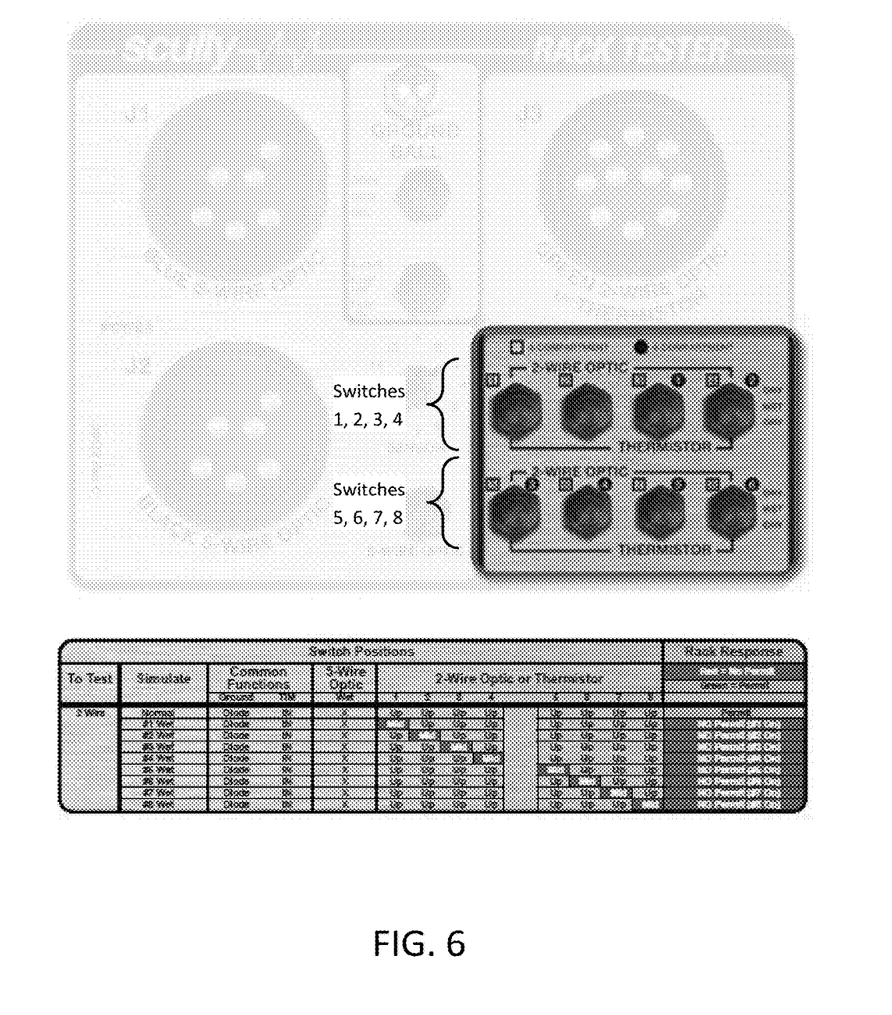
FIG. 6 shows an example methodology for thermistor sensor testing of a fluid monitoring controller using a fluid monitoring controller tester system, in accordance with an embodiment.

FIG. 6 shows an example methodology for thermistor sensor testing of a fluid monitoring controller using a fluid monitoring controller tester system, in accordance with an embodiment. When switches 1 through 8 are used to simulate Thermistor sensing, setting all switches to the DOWN position simulates a DRY condition for all sensors, and therefore the PERMIT indicator should illuminate on the controller 104. When any of the eight switches are moved to the CENTER position, which simulates a WET condition, the NO-PERMIT indicator for the corresponding sensor should illuminate on the controller 104. In general, switches 1-4 simulate heated thermistors, and switches 5-8 simulate non-heated thermistors, although it will be appreciated that the switches can be configured in any number of different ways. FIG. 6 shows the expected Rack Response to each of the various possible switch settings on the tester, in accordance with an embodiment.

Figure 7:
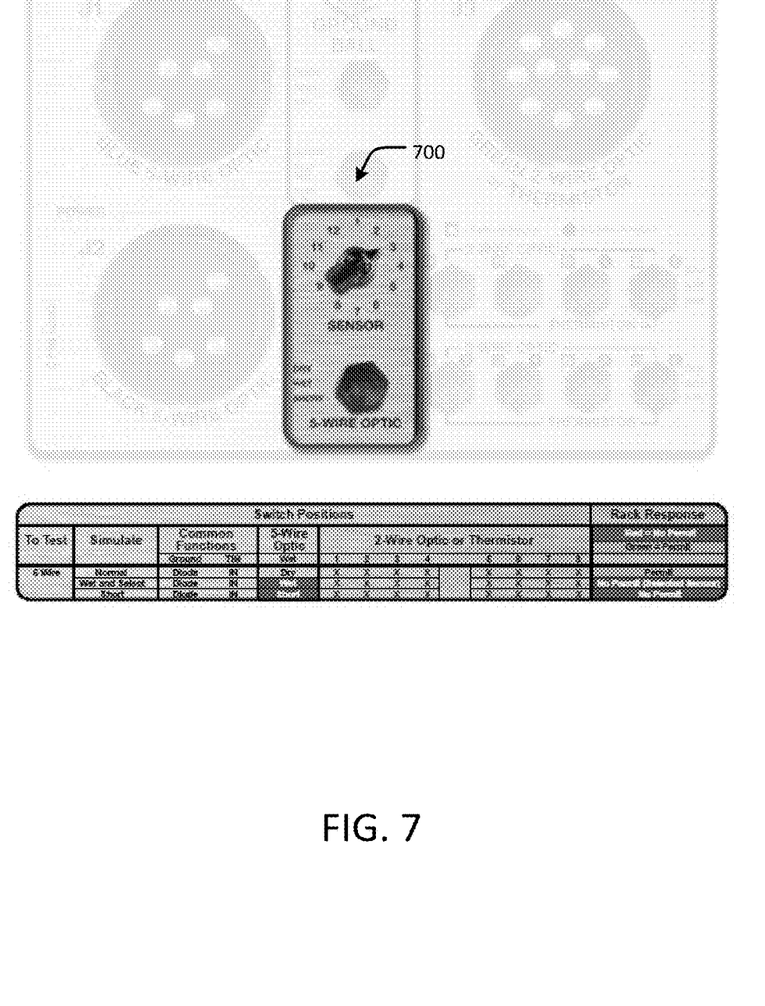
FIG. 7 shows an example methodology for 5-Wire Optical sensor testing of a fluid monitoring controller using a fluid monitoring controller tester system, in accordance with an embodiment.
Figure 8:
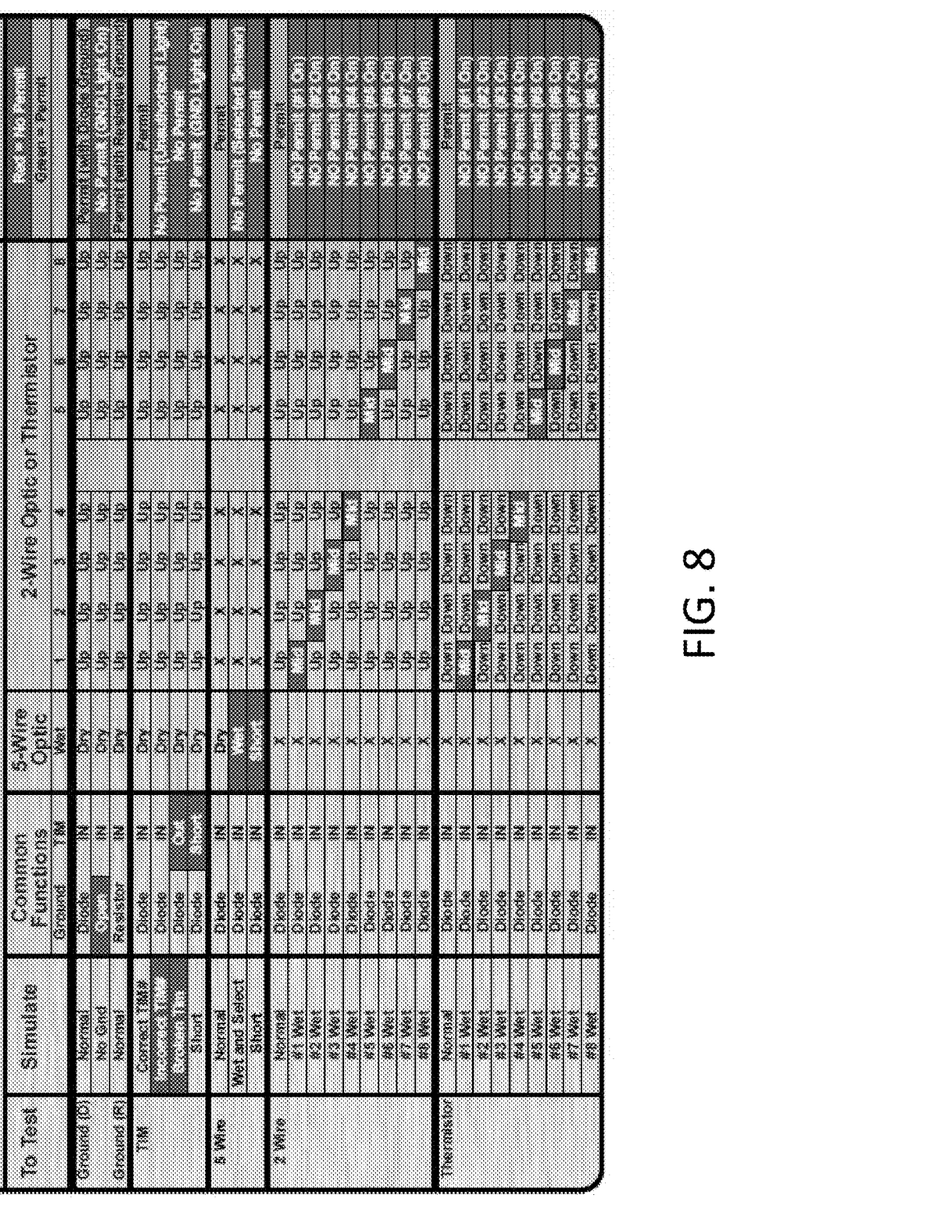
FIG. 8 is a chart showing various testing configurations of a fluid monitoring controller tester system, in accordance with an embodiment.

FIG. 7 shows an example methodology for 5-Wire Optical sensor testing of a fluid monitoring controller using a fluid monitoring controller tester system, in accordance with an embodiment. For 5-Wire Optical sensor testing, the 5-Wire Optical toggle switch and the Sensor rotary switch 700 provide several sensor simulation functions. When the Optic toggle switch is in the DRY (UP) position, the PERMIT indicator should illuminate on the controller 104 regardless of the position of the Sensor rotary switch. When the Optic toggle switch is in the SHORT (DOWN) position, a shorted sensor is simulated and the NO-PERMIT indicator should illuminate on the controller 104 regardless of the position of the Sensor rotary switch. When the Optic toggle switch is in the WET (CENTER) position, the Sensor rotary switch can be used to simulate which of the several sensors is indicating a WET condition. Note that each position #1 through #12 simulates that the corresponding sensor is in a WET condition. FIG. 8 is a chart showing various testing configurations of the tester, in accordance with an embodiment.

Figure 9:
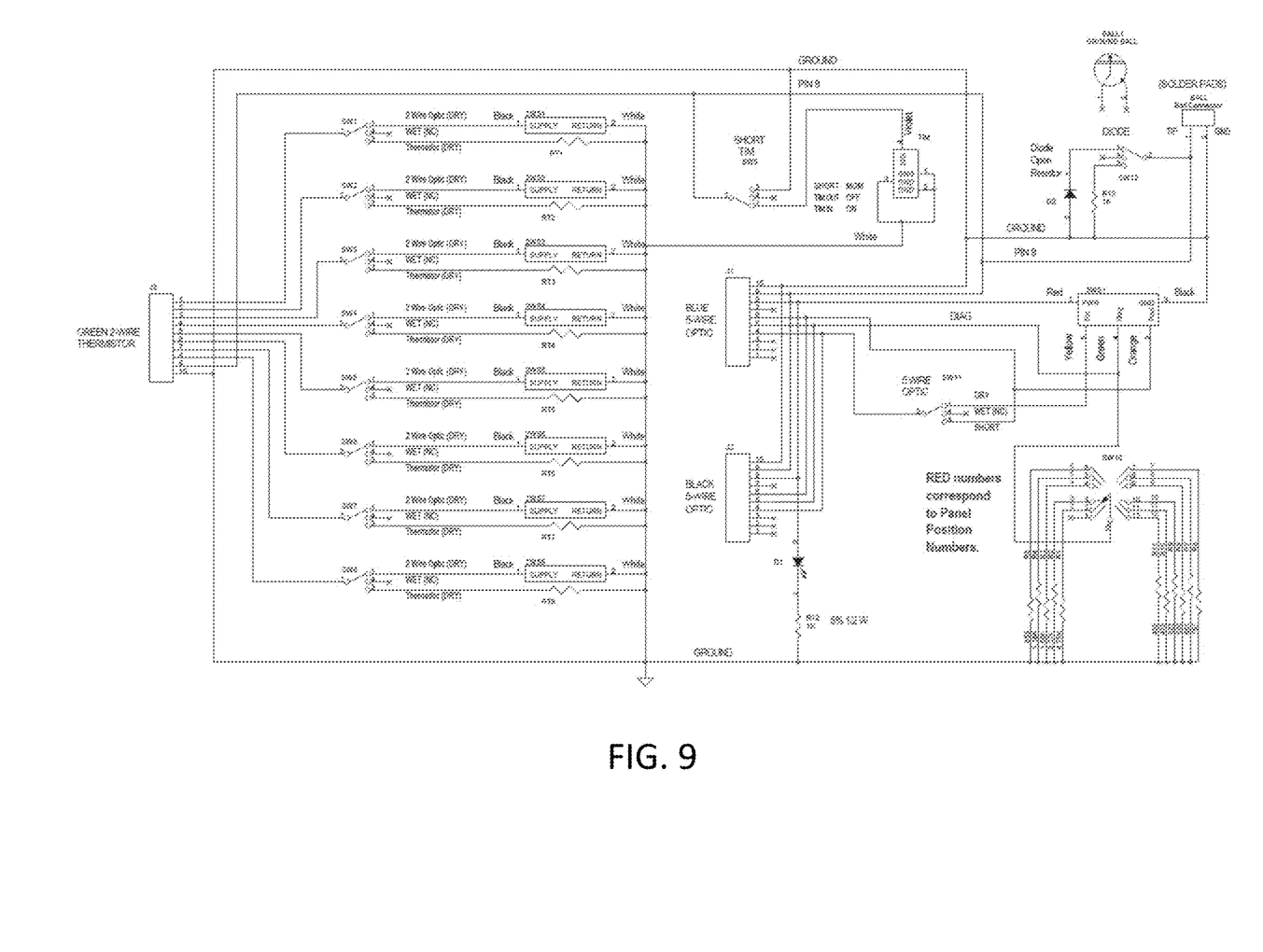
FIG. 9 is a schematic diagram of an example electronic circuit that can be implemented in a fluid monitoring controller tester system, in accordance with an embodiment.

FIG. 9 is a schematic diagram of an example electronic circuit that can be implemented in a fluid monitoring controller tester system, in accordance with an embodiment. For example, the circuit shown in FIG. 9 may be implemented in the tester 100 of FIG. 1 by coupling portions of the circuit to at least one of the electrical connectors of the tester 100 and to at least one of the selector switches of the tester 100. In some embodiments, the circuit can be configured to simulate a truck identification code based on the selected state of one or more of the selector switches of the tester 100, or to simulate a short circuit based on the selected state of one or more of the selector switches of the tester 100.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A portable tester of fluid monitoring controllers, comprising:
    an electrical connector configured to be removably connected to a cable;
    a plurality of selector switches electrically coupled to the electrical connector; and
    an electronic circuit coupled to the electrical connector and the selector switches, the electronic circuit configured to simulate, via the electrical connector, an output signal of either a 2-wire fuel tanker trailer fluid overfill sensor or a 5-wire fuel tanker trailer fluid overfill sensor based on a selected state of the selector switches.

2. The tester of claim 1, wherein the output signal represents a wet fluid overfill sensor condition while the selector switches are in a first state, and a dry fluid overfill sensor condition while the selector switches are in a second state that is different than the first state.

3. The tester of claim 1, further comprising an enclosure that is water resistant, impact resistant, and temperature resistant.

4. The tester of claim 1, wherein the tester is configured to be electrically coupled, in place of a fuel tanker trailer, to a fuel terminal fluid monitoring controller, such that signals output via the electrical connector to the fuel terminal fluid monitoring controller simulate signals output by one or more fuel tanker trailer fluid overfill sensors.

5. The tester of claim 1, wherein the output signal represents a simulated output of an optical fluid overfill sensor.

6. The tester of claim 1, wherein the output signal represents a simulated output of a thermistor.

7. The tester of claim 1, wherein the electronic circuit is further configured to simulate, via the electrical connector, a truck identification code based on the selected state of the selector switches.

8. The tester of claim 1, wherein the electronic circuit is further configured to simulate, via the electrical connector, a short circuit based on the selected state of the selector switches using one of a resistive ground and a diode ground.

9. The tester of claim 1 further including circuitry configured to limit voltage within the tester to approximately 15 Vdc or less and current within the tester to approximately 250 mA or less, wherein the circuitry does not include a capacitive element.

10. A system comprising:
    a fluid monitoring controller; and
    a portable tester comprising:
        an electrical connector configured to be removably connected to a cable;
        a plurality of selector switches electrically coupled to the electrical connector; and
        an electronic circuit coupled to the electrical connector and the selector switches, the electronic circuit configured to simulate, via the electrical connector, an output signal of either a 2-wire fuel tanker trailer fluid overfill sensor or a 5-wire fuel tanker trailer fluid overfill sensor based on a selected state of the selector switches, the tester configured to be electrically connectable to the controller via the cable.

11. The system of claim 10, further comprising the cable of claim 1 for electrically connecting the controller to the tester.

12. The system of claim 10, wherein the controller is configured to prevent a fuel transfer via a fuel terminal loading rack while the selector switches are in a first state, and further configured to permit the fuel transfer while the selector switches are in a second state that is different than the first state.

13. The system of claim 12, wherein the first state represents a simulated fluid overfill fault or other contingent condition of a fuel tanker trailer, and wherein the second state represents a simulated normative condition of the fuel tanker trailer.

14. The system of claim 10, wherein the selector switches are controlled by a microprocessor.

15. The system of claim 14, wherein the microprocessor is configured to analyze and compare monitoring signals, timing and voltage to a standard.

16. The system of claim 15, wherein the microprocessor is configured to compile the analyzed signals, timing and voltage for a certification report.

17. The system of claim 15, wherein the microprocessor is configured to transmit the analyzed signals, timing and voltage to a system distinct from the system via a network connection.

18. The system of claim 17, wherein the network connection includes at least one of a wired connection and a wireless connection.

19. The system of claim 18, wherein the wireless connection includes at least one of a WI-FI connection, a BLUETOOTH connection, and a ZIGBEE connection.

* * * * *